US007911084B2

(12) United States Patent
Bauer et al.

(10) Patent No.: US 7,911,084 B2

(45) Date of Patent: Mar. 22, 2011

(54) PARASITIC POWER SUPPLY FOR TRAFFIC CONTROL SYSTEMS

(75) Inventors: Martin L. Bauer, Oak Ridge, TN (US); James Vig Sherrill, Clinton, TN (US)

(73) Assignee: Aldis Corporation, Knoxville, TN (US)

( * ) Notice: Subject to any disclaimer, the term of this patent is extended or adjusted under 35 U.S.C. 154(b) by 437 days.

(21) Appl. No.: 12/217,679

(22) Filed: Jul. 8, 2008

(65) Prior Publication Data

US 2009/0015072 A1 Jan. 15, 2009

Related U.S. Application Data

(60) Provisional application No. 60/948,785, filed on Jul. 10, 2007.

(51) Int. Cl.
*H02J 7/00* (2006.01)
*G08G 1/095* (2006.01)

(52) U.S. Cl. .......................................... 307/65; 340/907

(58) Field of Classification Search .................... 307/32, 307/11, 12, 65; 340/907
See application file for complete search history.

(56) References Cited

U.S. PATENT DOCUMENTS

| | | | | |
|---|---|---|---|---|
| 5,736,795 | A | 4/1998 | Zuehlke et al. | |
| 5,811,963 | A | 9/1998 | Elwell | |
| 5,903,139 | A | 5/1999 | Kompelien | |
| 6,356,038 | B2 | 3/2002 | Bishel | |
| 6,657,418 | B2 | 12/2003 | Atherton | |
| 6,833,796 | B2 * | 12/2004 | Bourgault | 340/929 |
| 6,992,404 | B2 * | 1/2006 | Priest | 307/80 |
| 7,098,774 | B2 * | 8/2006 | Davenport et al. | 340/331 |
| 7,142,813 | B1 | 11/2006 | Desai | |
| 7,291,938 | B2 | 11/2007 | Phinney | |
| 2008/0013351 | A1 | 1/2008 | Alexander | |
| 2008/0031019 | A1 | 2/2008 | Alexander | |

* cited by examiner

*Primary Examiner* — Michael Rutland Wallis
(74) *Attorney, Agent, or Firm* — Robert J. Lauf

(57) ABSTRACT

A parasitic power supply provides for drawing power for an auxiliary device from a set of sequentially driven loads. A typical source of power is a traffic signal wherein the power may be sequentially applied to red, green and yellow lamps. The design provides isolation between loads so no two loads will be powered through any single-point failure of the power supply. The device may further contain control elements such as time delays to make the system compatible with requirements of safety devices used in traffic control systems to sense burned-out bulbs, and to sense conflicts between lighting patterns that are supposed to be mutually exclusive. The device may be configured as a separate component, or it may be integrated into a traffic signal head or into any selected device intended for connecting to a traffic signal head. The invention is particularly suitable for standard systems operating nominally at 115 VAC, though other AC voltages, and direct-current supplies, can also be used.

15 Claims, 8 Drawing Sheets

PARASITIC POWER SUPPLY FOR TRAFFIC CONTROL SYSTEMS

CROSS REFERENCE TO RELATED APPLICATION

This application claims the benefit of provisional application Ser. No. 60/948,785 filed on Jul. 10, 2007 by the present inventors, the entire disclosure of which is incorporated herein by reference.

BACKGROUND OF THE INVENTION

1. Field of the Invention

The present disclosure relates to vehicular traffic control indicators. More particularly, the invention relates to parasitic power supplies suitable for use with traffic control indicators.

2. Description of Related Art

In the field of traffic control, it is desirable to incorporate new devices, including cameras, speed detection systems, and various sensors for traffic or other security monitoring tasks. Traffic signal lights are centrally located and accessible, and have a supply of electrical power, so it would be desirable to make use of this via a parasitic power supply so that any retrofitted device could be powered without running a completely new power line from the grid to the new device.

Unfortunately, drawing power in parallel with traffic signal lamps presents a significant issue of safety because the operation of the lamp and of the lamp integrity sensing circuits must not be compromised. It is imperative that no two lamps are tied together through any single-point or credible fault of the parasitic power module. Furthermore, it may be necessary in some systems to let the traffic lamp power up normally for some period of time, usually less than one second, so that lamp current monitors will not be confused.

U.S. Pat. No. 5,736,795 to Zuehlke et al. describes how to steal power in a "series" switch, like a light switch, where no neutral is available. It uses a single source of power, and steals portions of AC cycles from the load. This approach is not suitable for use in traffic controls because it derives from a single source, not a commutating load, and it steals "series" power, whereas in traffic signals one needs to steal "parallel" power. Furthermore, only small amounts of power can be stolen, and it affects the load. The focus is to steal power for the device controlling the load, not for other applications.

U.S. Pat. No. 5,811,963 to Elwell is a similar approach to that of Zuehlke et al. '795 but power stealing is just serial. Only small amounts of power can be gotten this way, and it affects the load. U.S. Pat. No. 5,903,139 "Power stealing solid state switch for supplying operating power to an electronic control device" to Kompelien describes a methodology similar to that of Zuehlke et al. '795.

U.S. Pat. No. 6,356,038 to Bishel describes an AC controller that provides programmable switching of AC power flow, together with producing a source of DC power for operating the AC controller.

U.S. Pat. No. 6,657,418 to Atherton describes a parasitic power supply. As in several of the aforedescribed patents, the focus is serial power stealing, for powering the load controller.

U.S. Pat. No. 7,142,813 to Desai describes a system in which power is pulled from the digital data stream. This technique has been in use since the 1980s or '90s to steal power from serial and parallel ports of computers, to power small devices. U.S. Pat. No. 7,291,938 to Phinney describes a parasitic power supply intended to extract power from signals that are inbound or outbound from a piece of equipment. Neither of these patents describes a technique that can be used to pull more than "milliwatts" of power.

U.S. Pat. App. Pubs. 20080013351 and 20080031019 to Alexander describe methods for transforming electric power between two or more portals.

OBJECTS AND ADVANTAGES

Objects of the invention include: providing a parasitic power supply suitable for use with traffic signals; providing a parasitic power supply that is compatible with lamp diagnostic systems; providing a traffic signal indicator assembly having an on-board parasitic power supply for powering accessory devices; providing an accessory device having an on-board parasitic power supply compatible with conventional traffic signal indicators; providing a parasitic power module capable of drawing power from several sources that are powered in sequence; and powering an auxiliary load from a set of commutating power sources.

BRIEF SUMMARY OF THE INVENTION

According to one aspect of the invention, a parasitic power supply adapted to steal power from a multi-lamp traffic signal and supply power to an auxiliary device comprises: input connections from the respective incoming power lines of each of the lamps in the traffic signal, and from the common neutral of the lamps; a plurality of redundant power supplies, one for each of the lamps in the signal, the power supplies further comprising switches for isolating them from one another; output connections from the power supplies configured to deliver power to the auxiliary device; and, an energy storage device connected to the outputs of the redundant power supplies.

According to another aspect of the invention, a traffic signal having an onboard parasitic power supply comprises: a substantially rigid housing; at least two signal lamps contained within the housing, the lamps configured to be illuminated one at a time; a parasitic power supply integral with the housing, the power supply comprising input power connections from each of the signal lamps and from the common neutral of the lamps; and, output connections from the parasitic power supply configured to supply power to an auxiliary device.

According to another aspect of the invention, an electronic device configured to interface with a traffic signal head and draw power therefrom comprises: input connections adapted to be connected to the respective power circuits of each lamp in the signal head and to their common neutral; a functional device configured to perform a selected electronic function; and, a parasitic power supply configured to receive power from the respective lamp circuits and provide power to the functional device.

BRIEF DESCRIPTION OF THE DRAWINGS

A clear conception of the advantages and features of the invention, and of the components and operation of exemplary systems provided with the invention, will become more readily apparent by referring to the drawings accompanying and forming part of this specification, in which like numerals designate like elements in several views. The features are not necessarily drawn to scale.

DETAILED DESCRIPTION OF THE INVENTION

Figure 1:
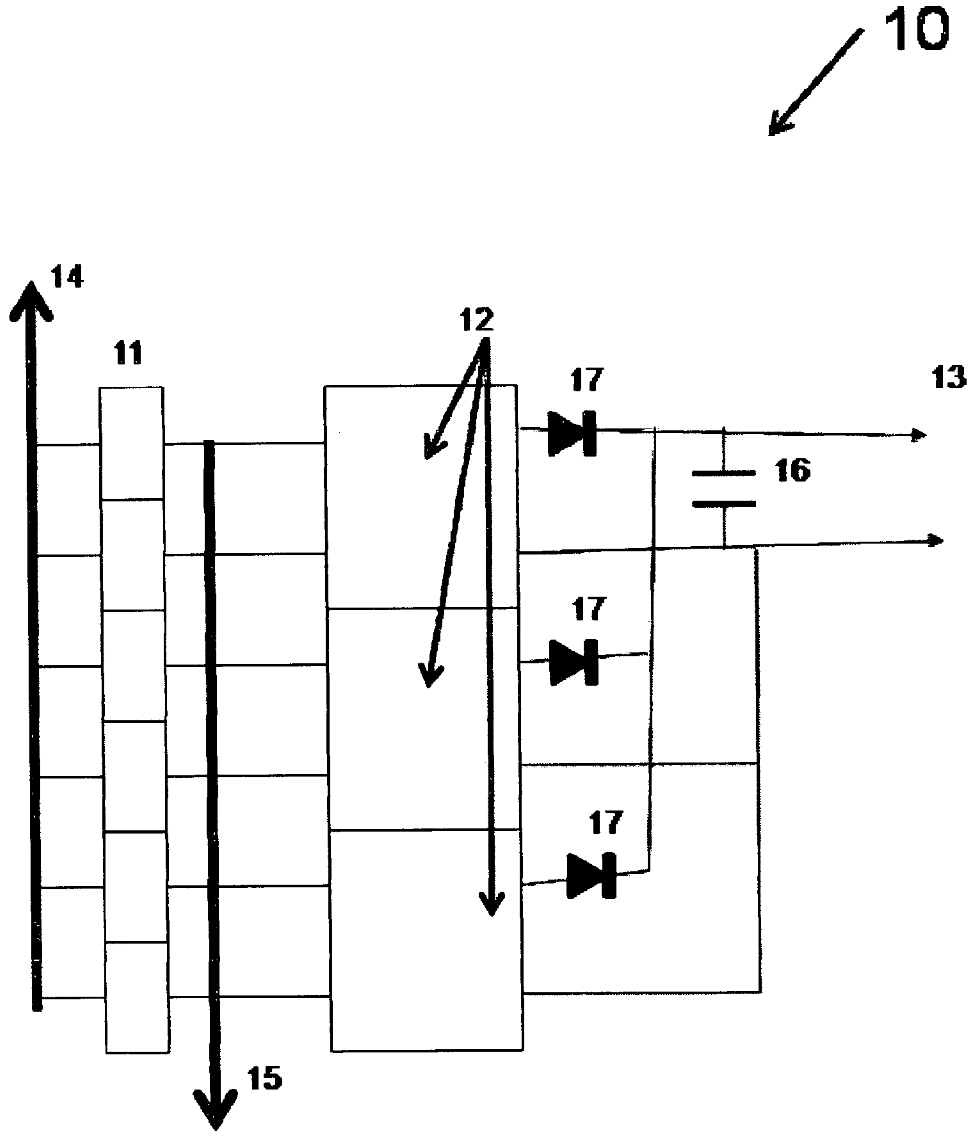
FIG. 1 illustrates schematically an embodiment of the present invention.

In its most general form the inventive apparatus and method provides for drawing power for an auxiliary device from a set of sequentially driven loads. One contemplated source of power is a traffic signal wherein the power may be sequentially applied to red, green and yellow lamps. The inventive design assures absolute isolation between loads so no two loads will be powered through any single-point failure of the power supply module. The device is also compatible with requirements of safety devices used in traffic control systems to sense burned-out bulbs, and to sense conflicts between lighting patterns that are supposed to be mutually exclusive. The invention is particularly suitable for standard systems operating nominally at 115 VAC, though other AC voltages, and direct-current supplies, are also contemplated within the scope of the invention. Power loads in the 5 to 20 watt range are contemplated, but it will be appreciated that the invention could be adapted to loads of 100 W or more with sufficient energy storage.

Drawing power in parallel with traffic signal lamps presents a significant issue of safety because the operation of the lamp and of the lamp integrity sensing circuits must not be compromised. It is imperative that no two lamps are tied together through any single-point or credible fault of the parasitic power module. This requires two levels of isolation. It may be necessary in some systems to let the traffic lamp power up normally for some period of time, usually less than one second, so that lamp current monitors will not be confused. This requires a controlled switch such that the application of power to the parasitic supply can be delayed in a managed fashion.

It will be appreciated that consideration must be given to the situation that occurs when the module is initially powered up, or when re-powering after a period of power failure. Because of a technique currently used to sense burned-out traffic lamps during their off phase, when a lamp circuit is off there is a certain minimum impedance, something greater than 100,000 Ohms, which auxiliary devices must present in order for the sensing circuit to function. This means that the parasitic module must pull less than 300 microamperes of current from a lamp power line whenever that lamp is off. The start-up power circuit must adhere to this requirement.

A very-low-power microcontroller device may be used to monitor and control the inventive device. This allows the circuit to power up on only 100 microamperes of current. Once the device is fully powered up, current is supplied from the main storage device. This is necessary because the isolation switches require more current than can be supplied by the start-up circuitry.

An additional requirement is to keep the distortion of the power drawn from the power source low enough so as not to disturb the operation of the solid-state switches or the primary load, the traffic lamps. This requires drawing equal currents from both half-cycles of the AC current, and consideration of how peak current is drawn for the energy storage device.

There are several strategies for monitoring the cycling of the power. Each individual input can be monitored for its voltage. This does require some power draw, though very little, from each power source. Alternatively, the output power can be monitored by following the discharge slope. The algorithm in the controller can then sense the loss of input power, wait the appropriate delay time, and then turn on the next anticipated power source. There may also be an algorithm in the controller to search for the next powered input, in case the expected input was not powered.

It is to be understood that both the foregoing general description and the following detailed description are exemplary and explanatory only and are not restrictive of the disclosure, as claimed.

As discussed herein, a traffic signal indicator may be a standard traffic signal having red, yellow, and green lights. The lights may comprise incandescent lamps, LED lamps, fluorescent lamps, or other light emitting devices. The lights may also comprise an infrared LED lamp in addition to a visible-light emitting source. The indicator may also be configured so that a light may be visible from one direction only, or the indicator may be multi-directional. The indicator may further comprise a crosswalk indicator for pedestrian traffic control.

A parasitic power supply may comprise multiple redundant power supplies, each drawing some power from a specific lamp circuit, combined with a short-term power storage battery or capacitor, to create a continuous source of power for accessory components such as sensor and data systems. Since power may not be continuously supplied to any particular lamp circuit during the normal operation of the traffic indicator, multiple redundant power supplies may permit the parasitic power supply to have a continuous source of power.

Figure 2:
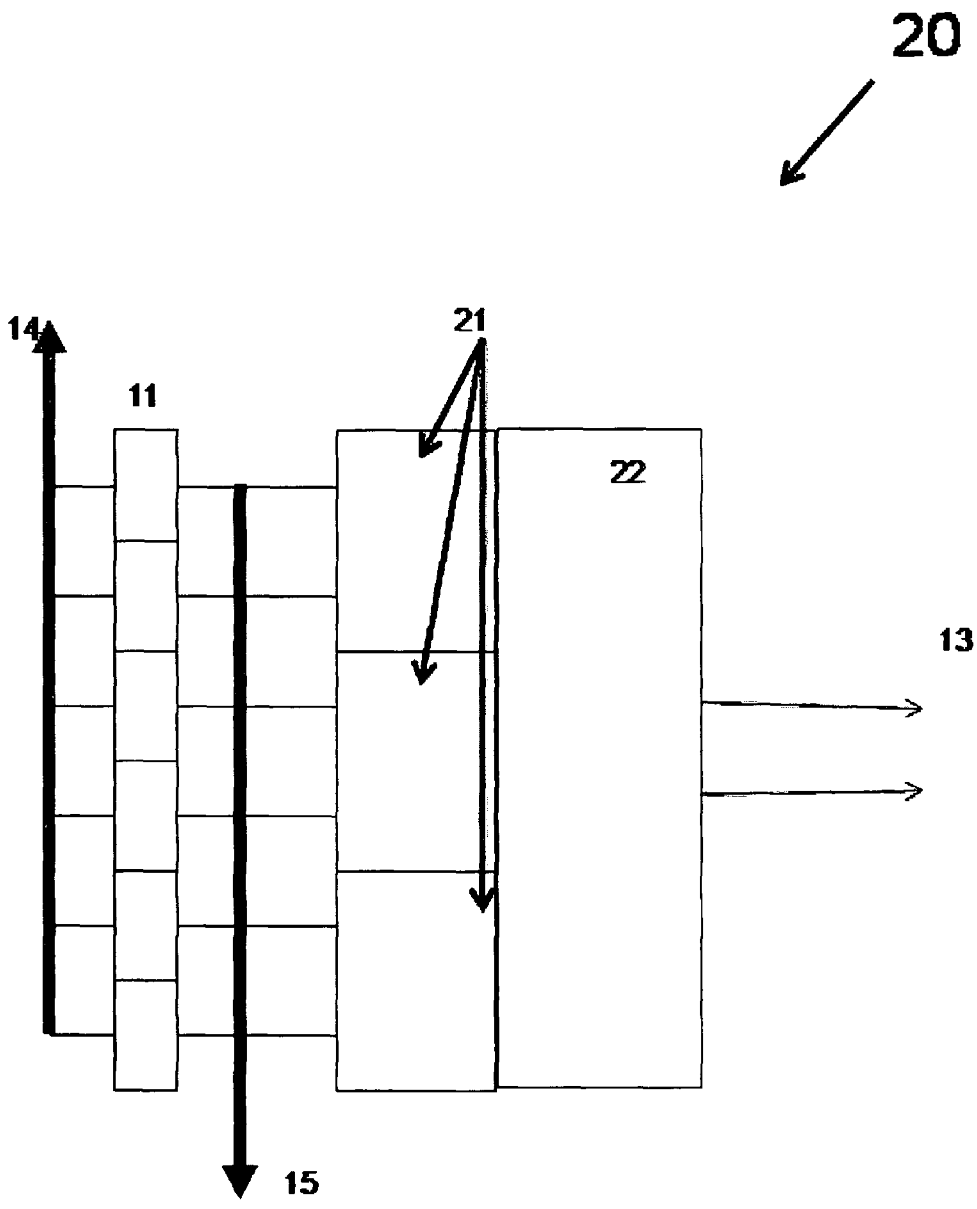
FIG. 2 illustrates schematically another embodiment of the present invention.
Figure 3:
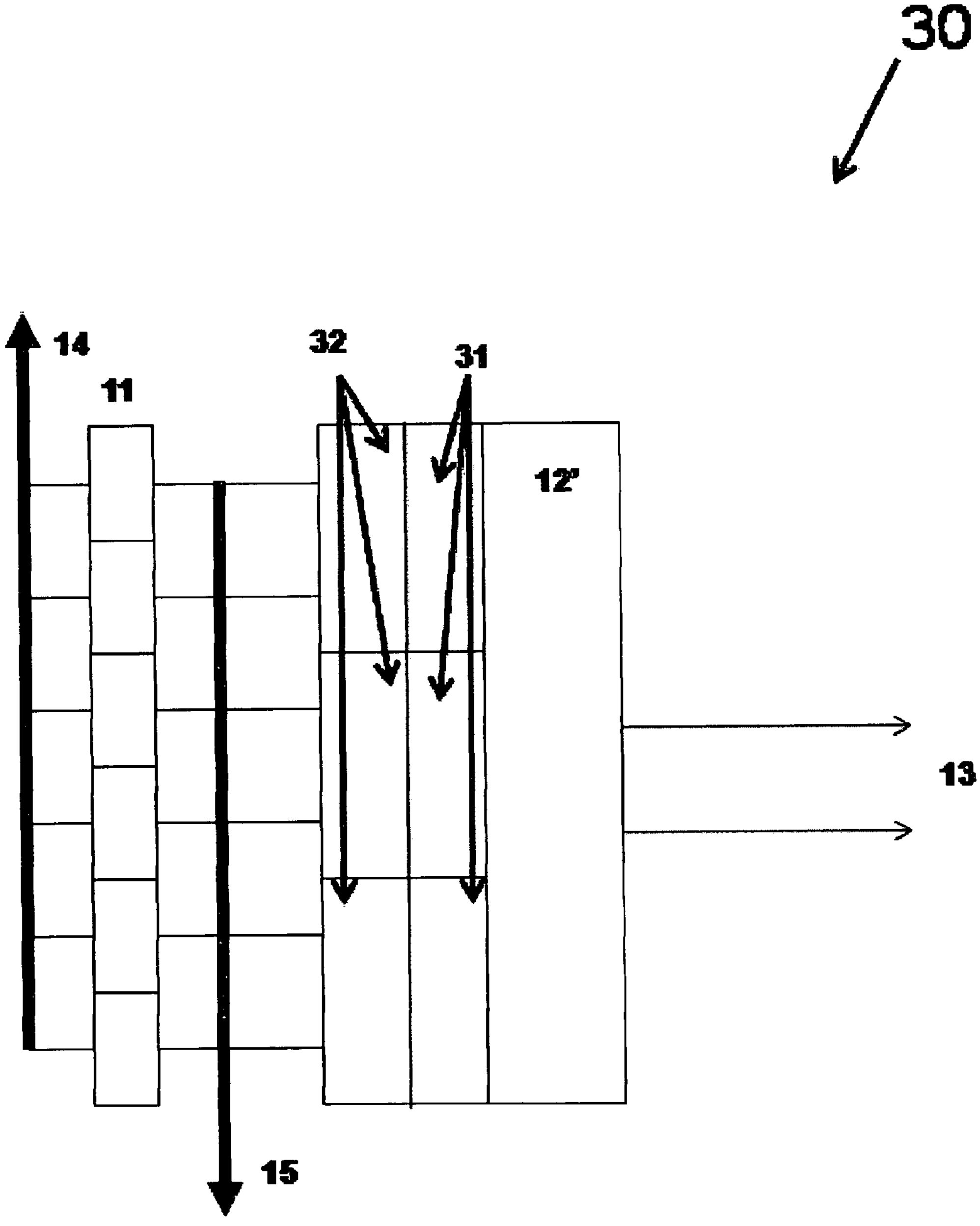
FIG. 3 illustrates schematically another embodiment of the present invention.

The parasitic power supply may comprise three separate input systems as shown generally in FIGS. 1-3, each of which may be electrically connected in parallel to a separate lamp circuit. The outputs of the three input sections may be tied together as a single output capable of providing power to ancillary devices such as computers and/or cameras. At the output junction an energy storage mechanism may be installed, such as a large capacitor array, or a rechargeable battery. Power regulation stages may also be provided for ensuring a reliable supply of electricity at the output.

There are a number of alternative architectures for such a parasitic power supply, including, but not limited to, the following examples.

Example

An embodiment of the invention is shown generally at 10 in FIG. 1, wherein a terminal block 11 may connect the traffic controller wiring 14 to the lamp wiring 15 and the power supplies 12. Three separate power supplies 12, which may be any suitable linear or switching power supplies, may be used, having outputs tied together, with or without isolation diodes 17, as necessary, each regulating to the final target voltage. A filter and hold-up capacitor 16 may also be present. The output power is fed to a user system through connection 13.

It will be appreciated that the circuit described in the foregoing example will provide adequate power to drive various devices and may be suitable for use with some signal lights or other commutating power source; however, it does not satisfy several additional safety-related requirements relevant to modern traffic signals related to low leakage current and the need to delay application of the load to a newly energized circuit.

Example

Another embodiment of the invention is shown generally at 20 in FIG. 2, wherein a terminal block 11 may connect the-controller wiring 14 to the lamp wiring 15 and the front-end modules 21. Front-end modules 21 differ from power supplies 12 of the previous example in that they may lack output power regulation. Their outputs may be combined and fed to a single output regulator 22.

As with the previous example, the circuit described in the foregoing example will provide adequate power to drive various devices in some applications; however, it does not satisfy several of the aforementioned safety-related requirements pertaining to low leakage current and the need to delay application of the load to a newly energized circuit.

Example

Another embodiment of the invention is shown generally at 30 in FIG. 3, wherein a terminal block 11 may connect the controller wiring 14 to the lamp wiring 15 and a system using three commutating switches 31 may be followed by a single power supply 12'. The switches 31 may be solid-state or mechanical switches. The commutating switches 31 may be controlled by a power sensing circuit 32, selecting the active circuit at all times. The power sensing circuit 32 may comprise a high-impedance measurement of the source voltage using either an analog-to-digital converter, external or internal to a microcontroller unit, or other suitable sensing circuit that presents a signal to the microcontroller unit as to the presence or absence of voltage on each of the power source lines. The commutating switches 31 may be implemented with silicon controlled rectifiers, other related semiconductor devices, or even mechanical relays. The power sensing circuit 32, comprising a microcontroller device and supporting circuitry, may ensure that only one switch 31 is on at a time, as well as providing line-to-line isolation.

In the foregoing example, each of the input power sources is individually sensed. This increases the complexity of the input measurement in proportion to the number of input power sources.

Example

Figure 4:
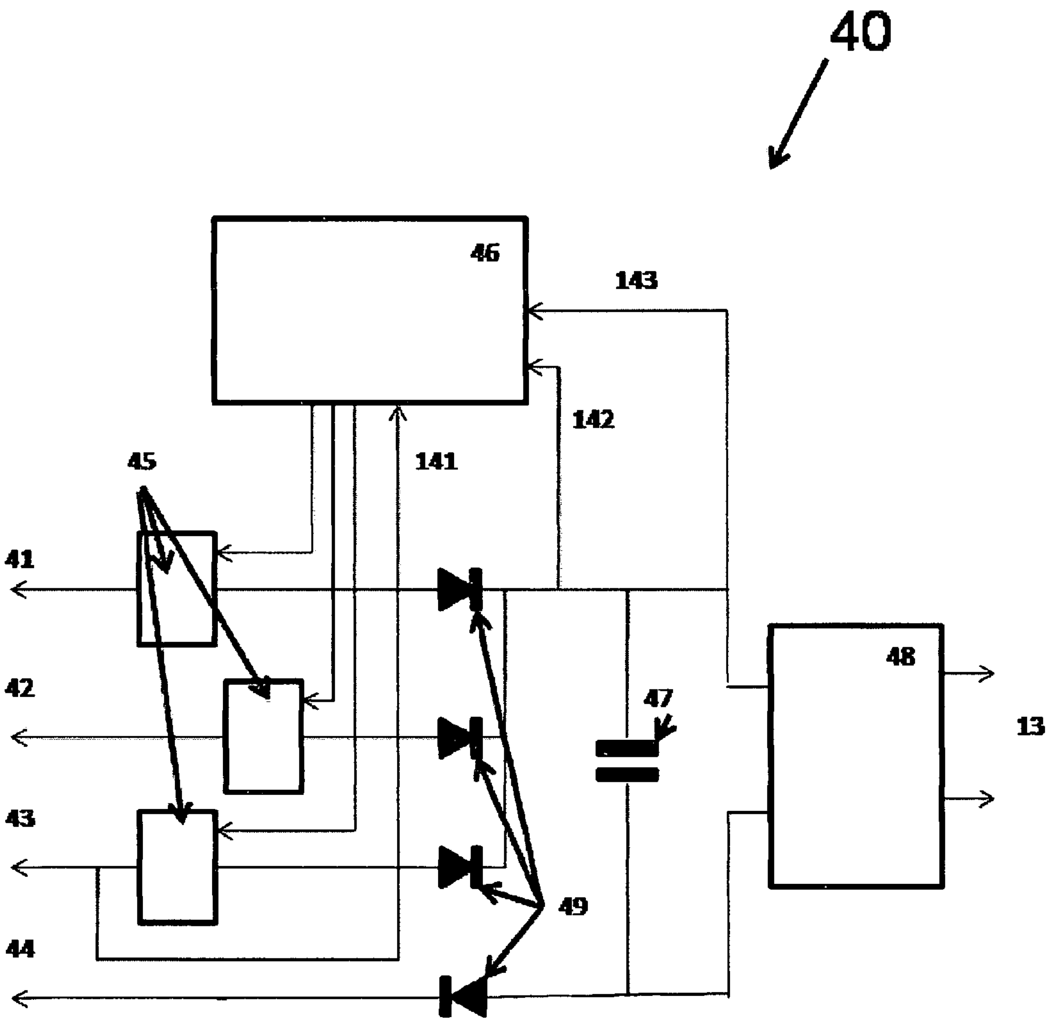
FIG. 4 illustrates schematically another embodiment of the present invention.

Another embodiment of the invention is shown generally at 40 in FIG. 4, wherein power is shown coming from lamps, Red 41, Yellow 42 and Green 43. They are typically wired with a single common neutral line 44. The lines from each of the lamps go to isolation switches 45. These are preferably solid-state, SCRs, TRIACs or power MOSFETS; it will be appreciated, however, that isolation switches could be implemented with mechanical relays, if desired. The intelligence in the microcontroller 46, which could be any suitable product [e.g., the MPS430 series, available from Texas Instruments, Dallas, Tex., or the PIC series from Microchip Technology, Chandler, Ariz.], ensures that no more than one of the switches is on at any given time. Inputs to microcontroller 46 include start-up power 141 from one of the lamps, typically green, operating power 142 from the main energy storage device 47, and a sample 143 of the voltage on the energy storage device 47.

The power from the three switches, and the common neutral line, go to a set of half-bridge rectifiers shown generally as 49, which serve not only to combine the power from the three isolation switches but also to provide an additional level of isolation between the power source lamps in case of failure of the switches or the controller.

The energy storage device 47 can be any number of elements, such as capacitors of various types or batteries; in many applications, it will preferably be an electrolytic capacitor (or a set of electrolytic capacitors). The size of the storage device must be such as to store enough energy for the delay time before switching on to a new circuit. The energy in this scheme is stored at about the peak value of the AC cycle. This voltage must be transformed down to that required by the typical low-voltage load. This is accomplished using any of a number of commercial power conversion modules 48 [e.g., universal input switching power supply modules such as the ECL10US12-P available from XP Power Pte. Ltd., Singapore].

Figure 5:
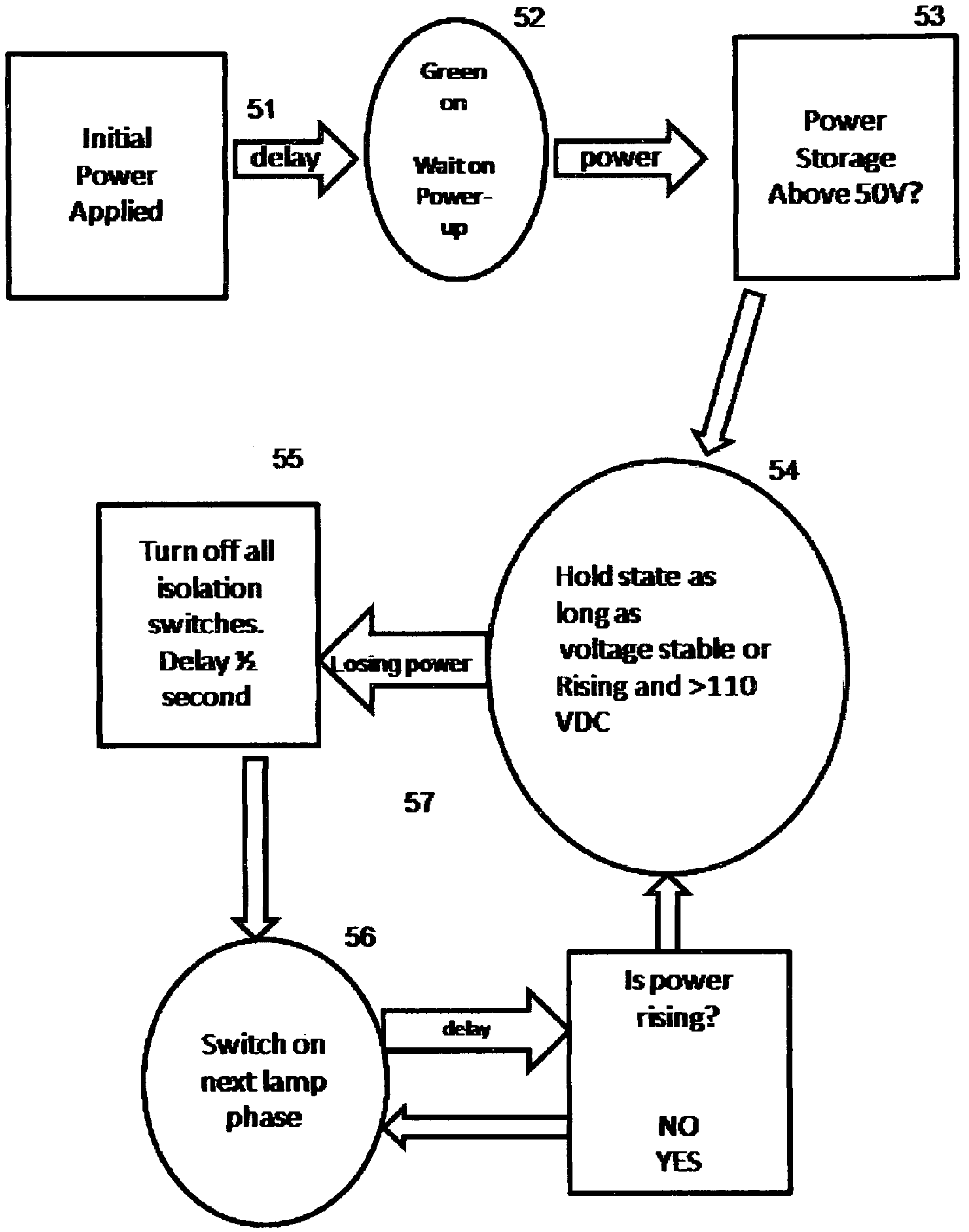
FIG. 5 illustrates the logical flow of a control system suitable for use in the present invention.

Sequential power application to each respective isolation switch is delayed for a short period of time, which can range from about one AC cycle up to about 1 second. (Applicants prefer a delay of about 0.25 to about 1 second.) This is to give any safety circuits that monitor the ON current of the lamp load sufficient time to react to any potential fault. In the foregoing example, with a load of up to 20 watts, 30 to 40 Joules (watt-seconds) of energy storage were used. At a DC high voltage of 165 volts, this requires about 3000 μF of capacitance. FIG. 5 illustrates the logical flow of the control system. Initial power-up is handled as a special case that should occur rarely. In the most conservative embodiment start-up power is only pulled from the green lamp circuit. This is because the red lamp circuit is more critical to safety, and one lamp circuit is sufficient for the start-up process to function. When sufficient voltage has built up from the microcontroller power supply, the microcontroller will begin its operation. A delay 51 (preferably one second) is programmed in to ensure that the controller power supply has sufficient reserve power to turn on the green lamp isolation switch. (The isolation switches are optically isolated, for a number of functional and safety reasons, and require significantly more power than the microcontroller, typically 10-times more.) The green isolation switch is enabled and the voltage of the main energy storage device is monitored periodically 53 until it is greater than 50V, signifying that power has been successfully supplied, and that sufficient power will now be available for full operation of the unit.

Subsequently the system enters the normal state 54 of reading the value of the energy storage device as long as the voltage is increasing or stable, and is greater than 110 V (for one particular embodiment).

When the monitoring system detects a significant drop in the energy storage voltage all switches are turned off for a delay period 55. (During this period power for the auxiliary load is supplied from the energy storage device, 47, in FIG. 4.) After this delay the isolation switch for the next expected power source is enabled 56. After a suitable delay (preferably tens of milliseconds) the power is monitored for rising voltage 57. If the voltage is not rising the circuit will sequence through each of the possible power sources, looking for the next active source 56. There is also a safety mode, if the power falls too low, which isolates all of the switches and forces the system to do a new power-up sequence.

The invention may be adapted to various commutating power sources besides traffic signals. For example, the commutating power source could be a set of alternately blinking lamp circuits, such as a school zone indicator, a railroad track control signal, or other warning system. There may be as few as a single flashing circuit, or as many as six to nine independent lamps in a signal head that may be accommodated within this design by varying timing of commutation and the size of the energy storage device.

It will be appreciated that the invention lends itself to various practical configurations. For example, it can be constructed as an add-on module suitable for retrofitting into existing traffic signals. Alternatively, it can be configured as a module that is integrated directly into a traffic signal at the time of manufacture, thereby affording a traffic signal having a built-in power outlet to which other electrical devices may be connected. In yet another embodiment, it can be configured as a module that is incorporated into an electrical device, thereby affording an electrical device that is suitable for wiring directly into a traffic signal. Some of these embodiments of the invention are described in greater detail in the following examples.

Example

Figure 6:
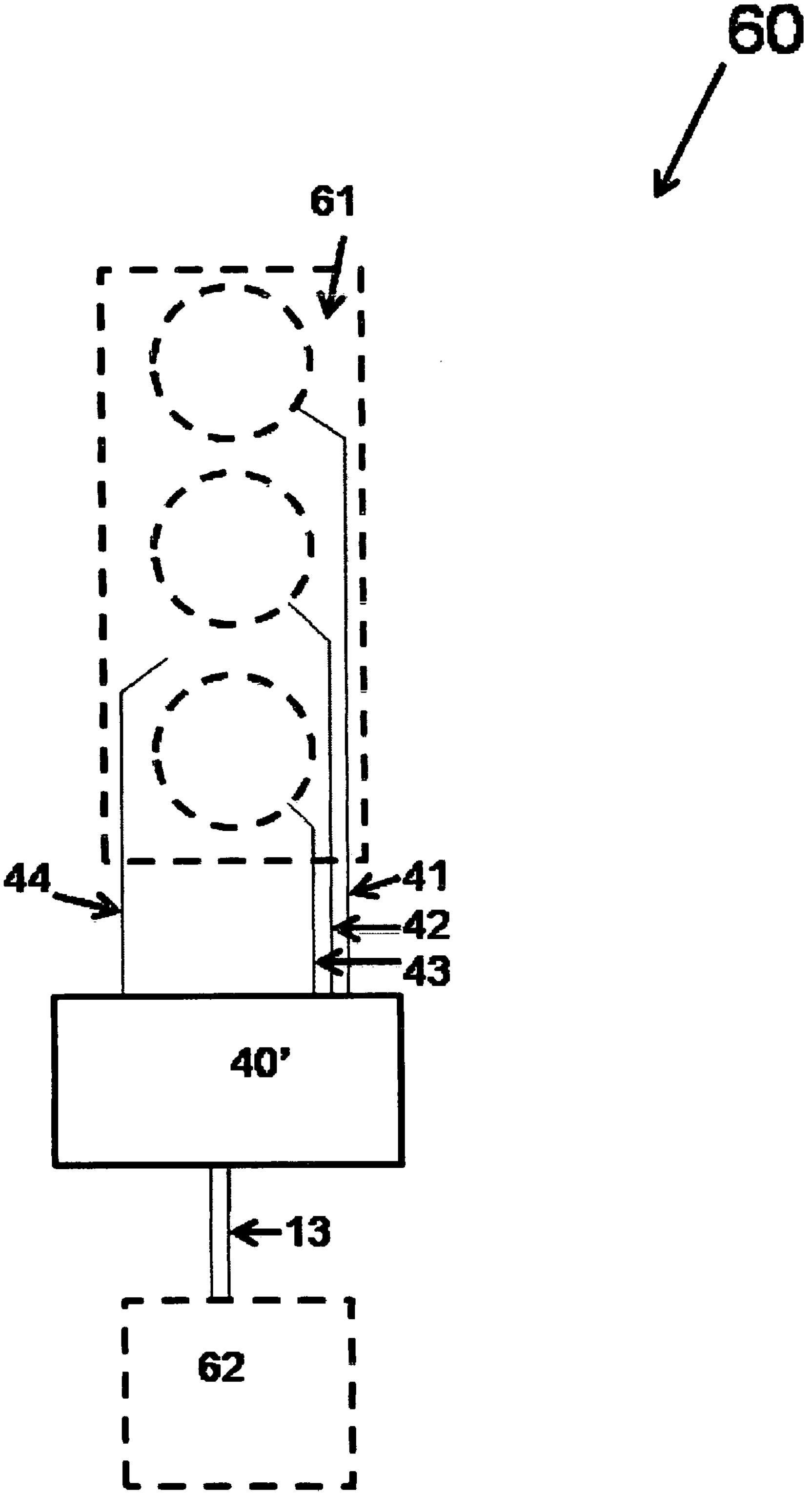
FIG. 6 illustrates schematically a configuration of the invention suitable for retrofitting onto an existing traffic signal unit.

FIG. 6 illustrates schematically at 60 a configuration of the invention suitable for retrofitting onto an existing traffic signal unit. Parasitic power device 40' is connected via wires 41-43 to existing traffic signal head 61. Controlled power is sent to user device 62 via wiring 13.

It will be appreciated that wiring 13 may comprise a pair of wires that may be connected to device 62 by soldering or by various familiar solderless connection techniques. Alternatively, wiring 13 may include an outlet or jack compatible with a mating plug from device 62.

Example

Figure 7:
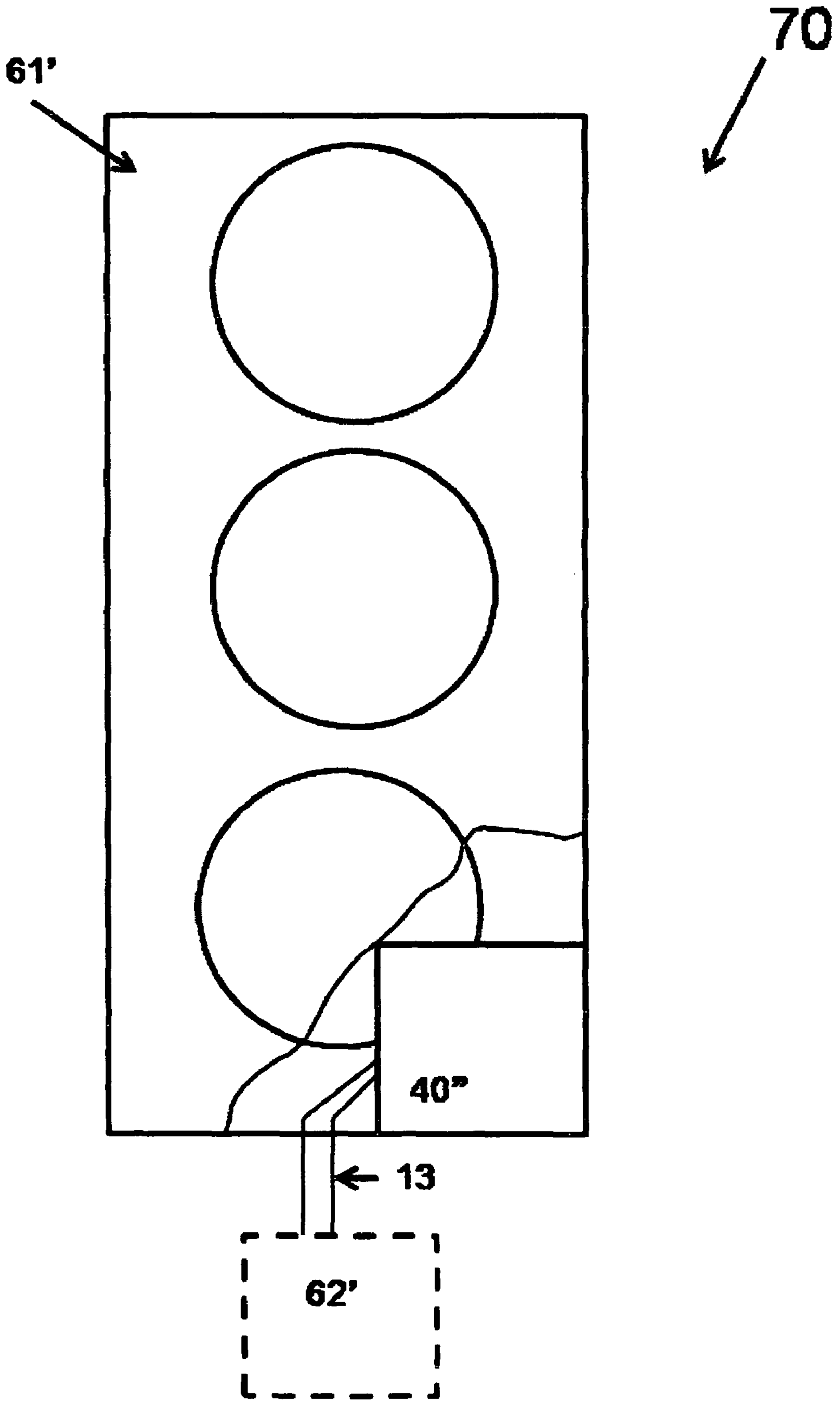
FIG. 7 illustrates schematically a "standard" traffic signal unit having the inventive power supply built into it, whereby after the signal unit is installed, selected electronic devices may be readily added or interchanged later.

FIG. 7 illustrates at 70 a "standard" traffic signal unit having the inventive power supply built into it, whereby after the signal unit is installed, selected electronic devices 62' may be readily added or interchanged later, and draw their power from the integral power supply. Parasitic power supply 40" is integrated into the traffic signal unit such that subsequent user devices 62' may be added.

It will be appreciated that the power supply module 40" may be located within the housing of traffic signal head 61', as shown schematically in FIG. 7, or it may be rigidly affixed to an outside surface of signal head 61'. In the latter case, module 40" will preferably be affixed to the underside of signal head 61' to afford the outputs 13 some protection from rain, snow, and the like.

It will be appreciated that the invention is capable of providing an amount of power (typically 5 to 20 W but feasibly up to 100 W) that enables the operation of numerous useful devices; some exemplary devices include video sensors, chemical, biological, or radiological sensors, radar or other speed measurement devices, RF transmitters or receivers, audio annunciators or alarms, and others.

Example

Figure 8:
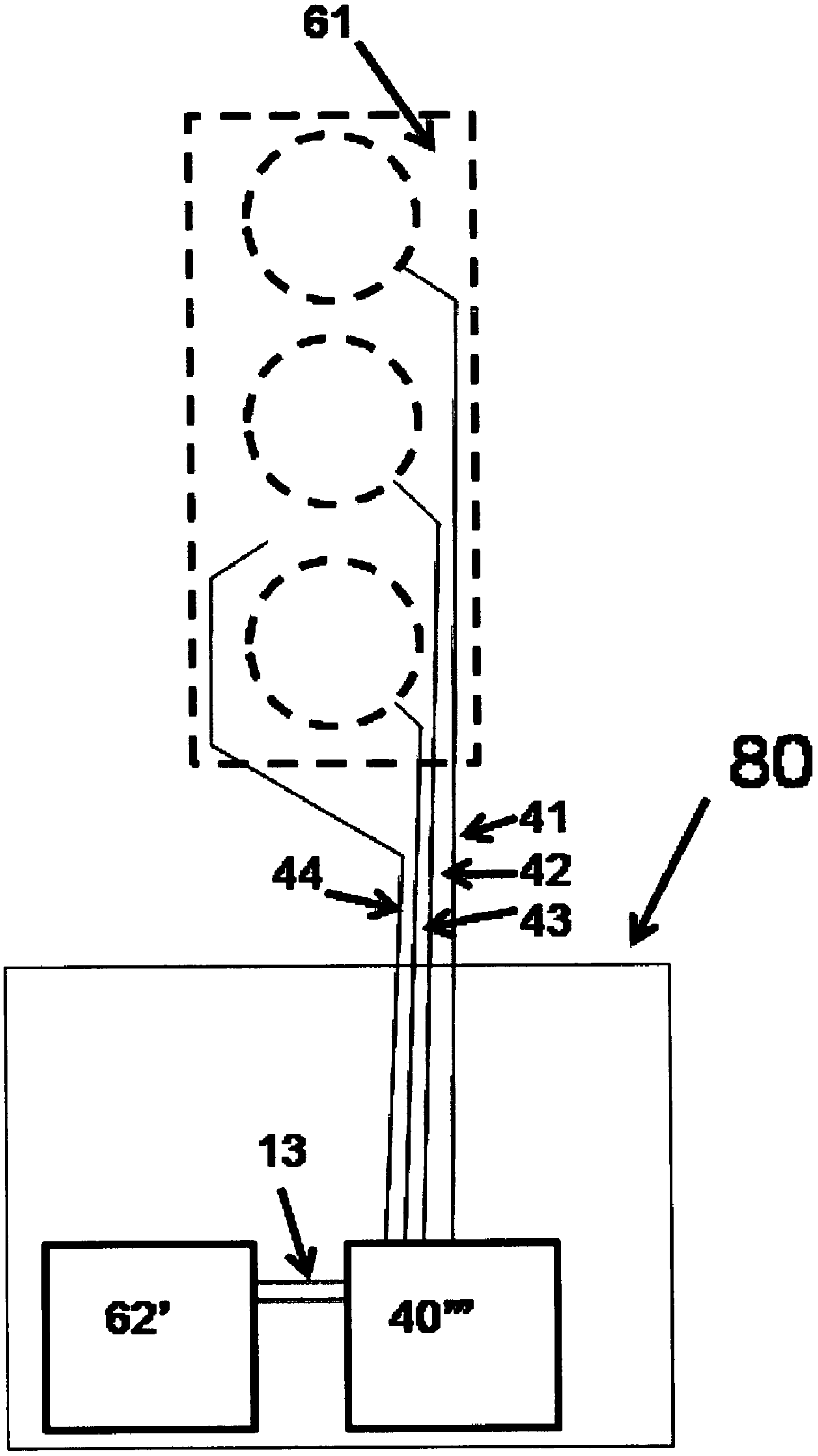
FIG. 8 illustrates schematically an electronic device having integrated therein a power supply constructed according to the invention.

FIG. 8 illustrates schematically at 80 an electronic device having integrated therein a power supply constructed according to the invention. As an alternative to the two previous examples the user device 80 may have the parasitic power system 40'" integrated into a unit with the selected functional device 62'. In this embodiment the selected device may be deployed to a particular site and wired directly to an existing signal head 61 and it will be compatible with existing safety and diagnostic systems.

Although numerous embodiments have been illustrated and described, the invention is not so limited. Numerous modifications, variations, substitutions and equivalents will occur to those skilled in the art without departing from the spirit and scope of the present invention.

We claim:

1. A parasitic power supply adapted to steal power from a multi-lamp traffic signal and supply power to an auxiliary device, comprising:

input connections from the respective incoming power lines of each of the lamps in said traffic signal, and from the common neutral of said lamps;

a plurality of redundant power supplies, one for each of said lamps in said signal, said power supplies further comprising switches for isolating them from one another;

a microcontroller configured to monitor the state of said traffic signal and actuate said isolation switches to engage a particular power supply when its respective signal lamp is receiving power;

output connections from said power supplies configured to deliver power to said auxiliary device; and, an energy storage device connected to said outputs of said redundant power supplies.

2. The parasitic power supply of claim 1 wherein said traffic signal comprises at least two lamps, wherein at least one of said lamps is normally illuminated at any one time.

3. The parasitic power supply of claim 1 wherein each of said redundant power supplies comprises a device selected from the group consisting of: linear power supplies and switching power supplies.

4. The parasitic power supply of claim 1 wherein each of said redundant power supplies further comprises an output regulator.

5. The parasitic power supply of claim 1 wherein said isolating switches comprise devices selected from the group consisting of: SCRs; TRIACs; power MOSFETs; half-bridge rectifiers; and mechanical relays.

6. The parasitic power supply of claim 1 wherein said energy storage device is selected from the group consisting of: capacitors and batteries.

7. The parasitic power supply of claim 1 wherein said microcontroller delays the actuation of each of said isolation switches for a selected time interval after its respective signal lamp is energized.

8. The parasitic power supply of claim 7 wherein said selected time interval is in the range from about 0.25 to 1.0 second.

9. A traffic signal having an onboard parasitic power supply, comprising:

a substantially rigid housing;

at least two signal lamps contained within said housing, said lamps configured to be illuminated independently;

a parasitic power supply integral with said housing, said power supply comprising a plurality of redundant power supplies, one for each of said lamps in said signal, said power supplies further comprising switches for isolating them from one another, output connections from said power supplies configured to deliver power to said auxiliary device, an energy storage device connected to said outputs of said redundant power supplies, input power connections from each of said signal lamps and from the common neutral of said lamps, and a microcontroller configured to monitor the state of said traffic signal and actuate said isolation switches to engage a particular power supply when its respective signal lamp is receiving power; and, output connections from said parasitic power supply configured to supply power to an auxiliary device.

10. The traffic signal of claim 9 wherein said isolating switches comprise devices selected from the group consisting of: SCRs; TRIACs; power MOSFETs; half-bridge rectifiers; and mechanical relays.

11. The traffic signal of claim 9 wherein said microcontroller delays the actuation of each of said isolation switches for a selected time interval after its respective signal lamp is energized.

12. The traffic signal of claim 11 wherein said selected time interval is in the range from about 0.25 to 1.0 second.

13. An electronic device configured to interface with a traffic signal head and draw power therefrom, comprising:

input connections adapted to be connected to the respective power circuits of each lamp in said signal head and to their common neutral;

a functional device configured to perform a selected electronic function; and, a parasitic power supply configured to receive power from the respective lamp circuits and provide power to said functional device, said parasitic power supply comprising:

a plurality of redundant power supplies, one for each of said lamps in said signal, said power supplies further comprising switches for isolating them from one another;

a microcontroller configured to monitor the state of said traffic signal and actuate said isolation switches to engage a particular power supply when its respective signal lamp is receiving power; and, an energy storage device connected to said outputs of said redundant power supplies.

14. The device of claim 13 wherein said microcontroller delays the actuation of each of said isolation switches for a selected time interval after its respective signal lamp is energized.

15. The device of claim 13 wherein said functional device comprises a device selected from the group consisting of: video sensors; chemical, biological, and radiological sensors; radar and other speed measurement devices; RF transmitters and receivers; and, audio annunciators and alarms.

* * * * *